Patented Oct. 25, 1932

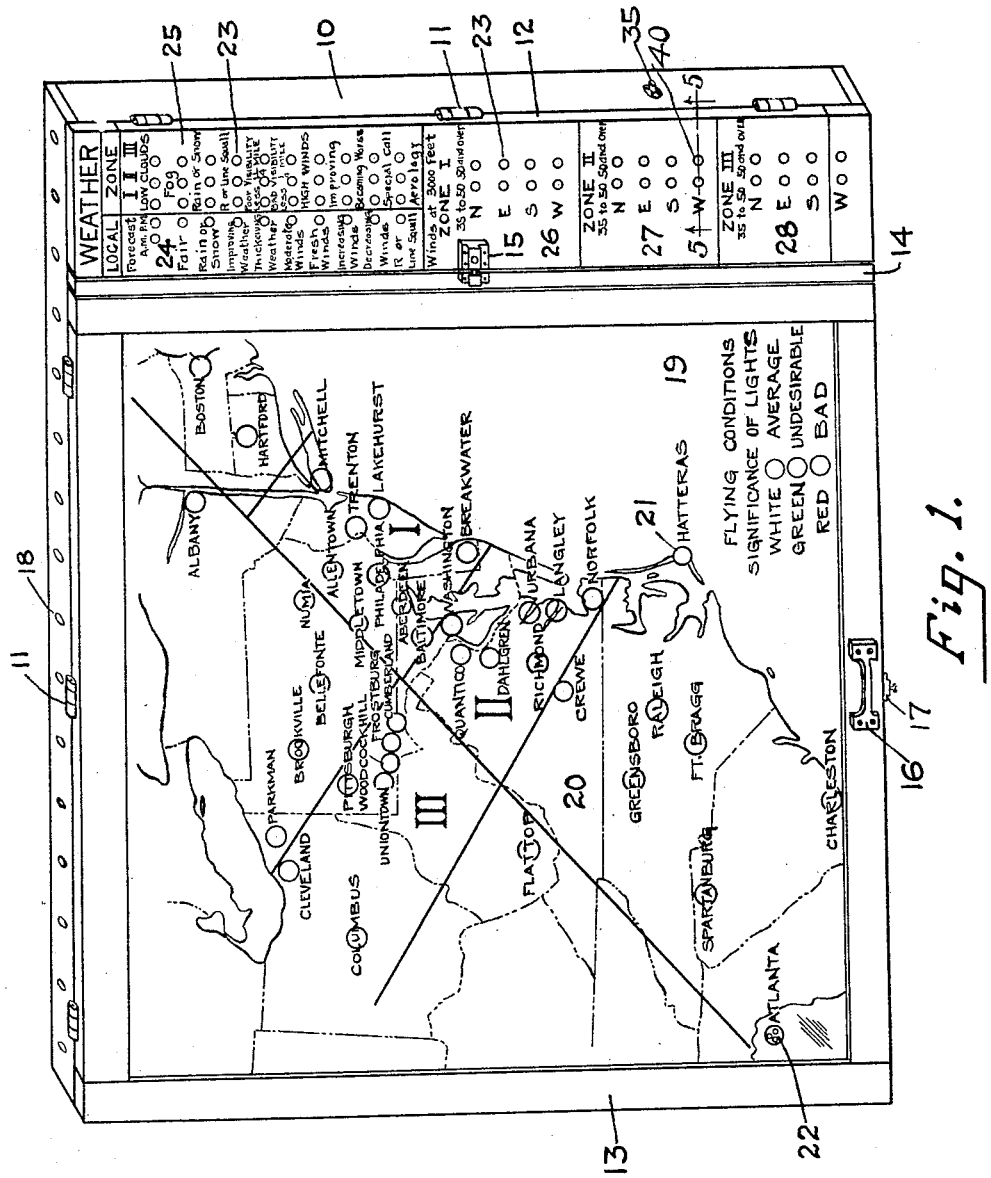

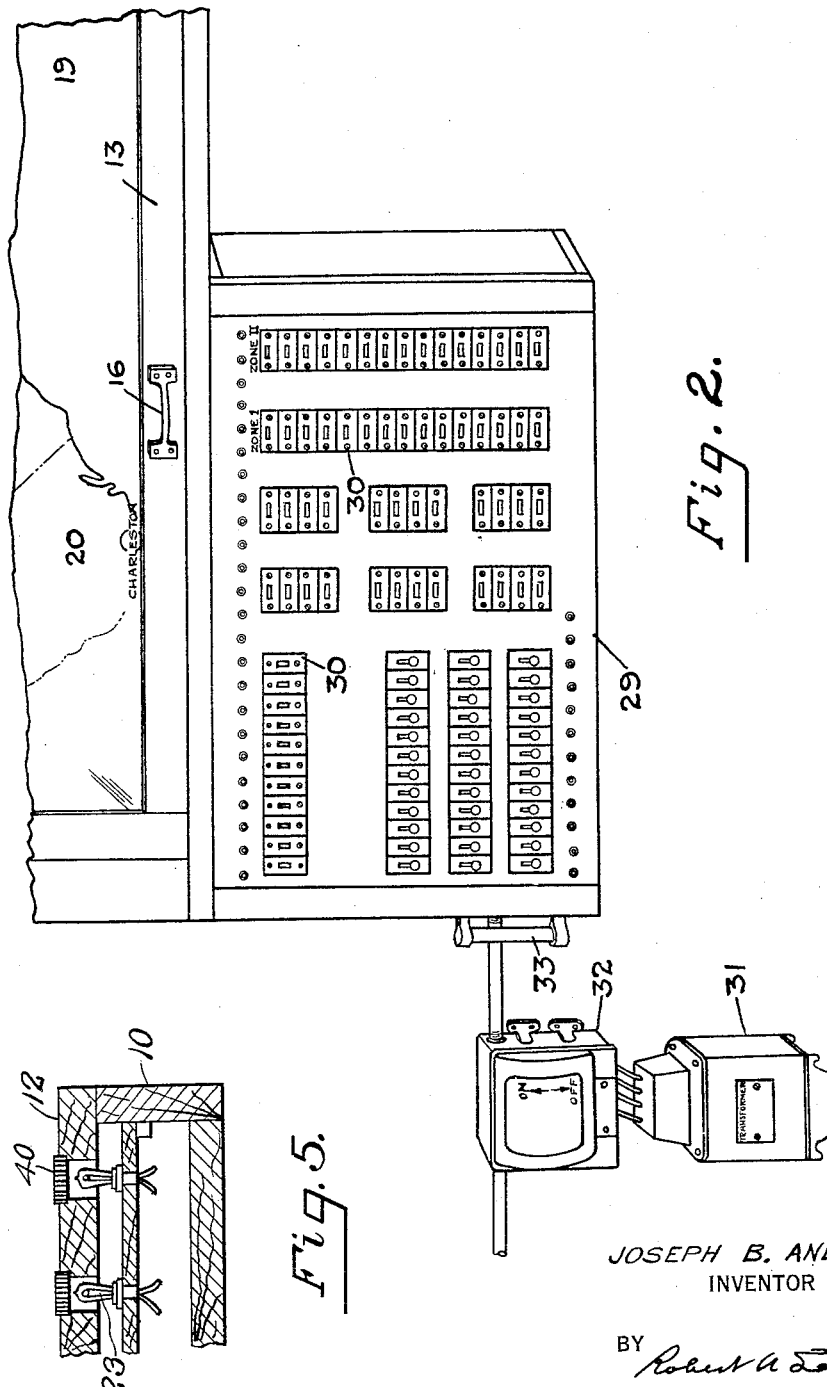

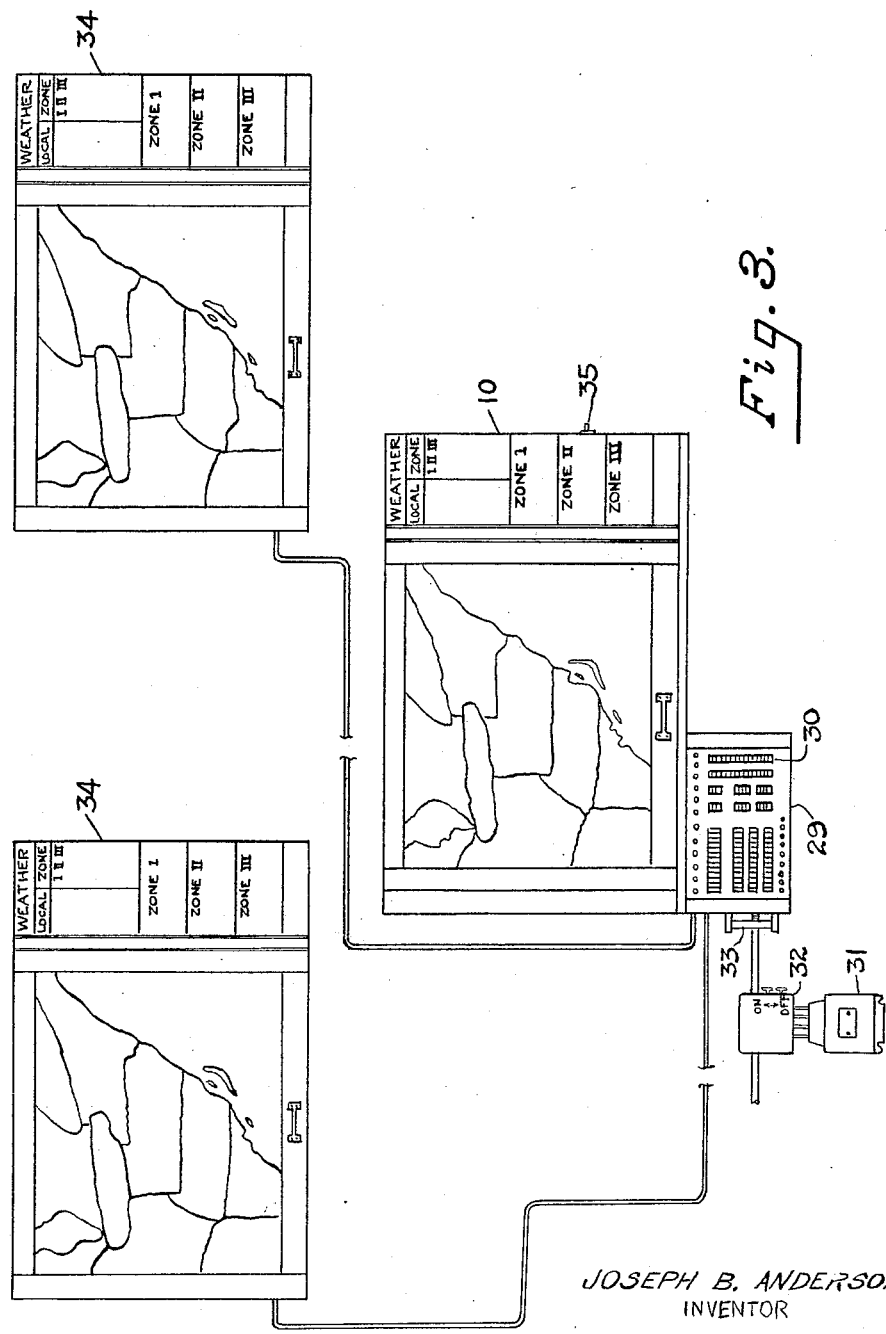

1,884,500

UNITED STATES PATENT OFFICE

JOSEPH B. ANDERSON, OF THE UNITED STATES NAVY

MAP

Application filed October 9, 1931. Serial No. 567,867.

(GRANTED UNDER THE ACT OF MARCH 3, 1883, AS AMENDED APRIL 30, 1928; 370 O. G. 757)

My invention relates broadly to maps and more particularly to a weather map.

The primary object of my invention is to show on a map the existing weather conditions over a given area covering routes used by aircrafts.

Another object of my invention is to produce on a map various color schemes designating weather conditions reported from time to time for given areas over which aircraft routes are established.

A further object of my invention is to provide means for illuminating a translucent map with various colors to indicate changing weather conditions as reported by various sections so that a pilot of an aircraft or interested persons may see at a glance what the existing weather conditions are at the various stations indicated on the map.

It is also an object of my invention to have a master map and one or more secondary maps operated by the controls for the master map.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Fig. 1 is a perspective view of my improved map with a portion thereof broken away;

Fig. 2 is a perspective view showing a detail of my improved map;

Fig. 3 is a diagrammatic view showing a master map and two secondary maps.

Figure 4 shows a detail of my improved device.

Figure 5 is a sectional view on lines 5—5 of Figure 1.

Referring more particularly to the drawings, 10 indicates a cabinet having fastened thereto by hinges 11 an indicating panel 12 and a map frame 13. A cross strip 14 is placed between the panel 12 and frame 13 and a latch 15 secures the panel 12 to this strip. The frame 13 has a handle 16 for conveniently raising or lowering the same on the hinges 11 and it is fastened to the cabinet 10 by a latch 17. The cabinet is also provided with a number of small openings 18 for the purpose of ventilation.

Held in the frame 13 is a translucent plate 19 on which is sketched, painted or printed a map 20 of a country or section thereof. This map is divided into desirable weather zones, as shown by roman numerals I, II and III and the names of the various towns and cities that transmit weather reports are exactly located by circles 21 with the respective names of the places indicated in close proximity to the circles.

Under each circle is a group of two or more colored lights 22 and, for the purpose of illustration in Figure 4, I have shown a group consisting of a red, white and green light. These colors as described on the map itself signify flying conditions prevailing at the particular circle lighted.

The panel 12 also has various colored plates 40 and lights 23 with descriptive terms setting out what each light indicates so that detail information of the weather may be given for the various stations or zones, particularly in areas which are shown on the map to have weather conditions which make flying undesirable or actually dangerous. For the purpose of illustration, I have divided panel 12 into five sections; namely, section 24 for local weather conditions, section 25 for weather conditions of zones I, II and III and sections 26, 27, and 28 giving the wind conditions for zones I, II and III respectively.

Each group of lights 22 for the map 20 and the lights 23 on panel 12 are suitably connected by wires, not shown, to a master switch board 29. This board has the necessary switch 30 with descriptive terms stating what lights each of the switches control. The switches controlling lights 22 are so arranged that only one light will be on at a time. A transformer 31 which supplies current at the proper voltage has leads into a main or control switch 32 and a rheostat 33 secured to the side of the switch board 29 provides the proper resistance depending upon the number of lights burning at any one time.

In Figure 3, I have shown a master weather map with two secondary maps 34 operated by the master map. I desire it to be understood that there can be one or more secondary maps located at various points and operated from the main switch board for the master map situated at the place where the weather reports are received. For example, the master map can be placed in the aerology building of an airfield to operate secondary maps placed at various points on the field or located in suitable places at various fields in the same area. A push bell switch 35 on the side of cabinet 10 may be operated to notify the interested parties at the secondary maps that a change in weather conditions is being made on the maps.

In the practical operation of my improved device, weather reports which are received from the various sections of the country by telephone, radio, telegraph or any other form of communication, are transferred to the weather map or maps by operating switches 30 for the lights describing the conditions reported. In this manner, the map also indicates the spreading of weather conditions, that is, a storm may be traced from one point to another throughout the given zones and the time of its arrival at various places closely estimated and indicated by changing the lights. Large lights or other means of illumination may be used to indicate the prevailing weather conditions in zones, such as zones I, II and III shown in Figure 1. Changing weather conditions are also indicated on panel 12 by burning two or more of lights 23 for the particular area designated. Thus, if lights indicating fair and rain or snow are burning simultaneously, it means that the weather will change shortly from the existing condition to the other noted.

It will be understood that the above description and accompanying drawings comprehend only the general and preferred embodiment of my invention, and that various changes in construction, proportions and arrangement of parts may be made within the scope of this invention and the appended claims, without sacrificing any of the advantages of my invention.

The herein described invention may be manufactured and used by or for the Government of the United States of America for governmental purposes without the payment to me of any royalties thereon.

Having thus described my invention, what I claim is:

1. A weather map comprising a cabinet having a translucent member forming a portion thereof, a map associated with said member, groups of various colored lights, each light signifying a condition of the weather, positioned in said cabinet in under designated localities on the map for indicating by the different colors of the lights the weather conditions of the localities and means for operating said lights whereby only one light of each group can be lit.

2. A weather map comprising a cabinet having a translucent member forming a portion thereof, a map associated with said member, groups of various colored lights, each light signifying a condition of the weather, positioned in said cabinet in under designated localities on the map for indicating by the different colors of the lights the general weather conditions, such as good, average or bad, of the localities, means for operating said lights whereby only one light of each group can be lit at one time, and a panel juxtaposed to said member, said panel having means to indicate for designated areas detailed weather conditions and flying information.

3. A weather map comprising a cabinet having a translucent member forming a portion of one side of said cabinet, a map mounted on said member, a panel having descriptive weather terms thereon juxtaposed to said map member and fastened to the cabinet, means in said cabinet adapted to indicate weather conditions on said map and means adapted to indicate on said panel detailed weather conditions in accordance with the descriptive terms thereon.

4. A weather map comprising a cabinet having a translucent member forming a portion thereof, a map mounted on said member, means adapted to illuminate one or more points setting out cities or designated areas on said map to indicate by means of colored lighting effects in the weather conditions at these points, and a panel having means to indicate detailed weather conditions for said cities or designated areas on said map, juxtaposed to said translucent member and fastened to the cabinet.

5. A weather map comprising a cabinet having a translucent member forming a portion thereof, a map showing cities, towns and zones mounted on said member, illuminating means adapted to indicate by colored lighting effects in the weather conditions in said town, cities or zones, a panel having descriptive terms thereon, and illuminating means fastened to said cabinet whereby detailed weather conditions can be indicated on the panel.

6. In combination, a master weather map comprising a cabinet having a translucent member forming a portion thereof, a map mounted on said member, a detailed weather indicating panel juxtaposed to said map and fastened to the cabinet, means adapted to indicate weather conditions on said map and panel, operating means for said indicating means and one or more corresponding secondary weather maps adapted to be operated by the operating means of said master map.

JOSEPH B. ANDERSON.